US010613107B2

(12) United States Patent
Yamagata et al.

(10) Patent No.: US 10,613,107 B2
(45) Date of Patent: Apr. 7, 2020

(54) SPECIMEN CONVEYANCE DEVICE AND SPECIMEN PROCESSING SYSTEM

(71) Applicant: HITACHI HIGH-TECHNOLOGIES CORPORATION, Tokyo (JP)

(72) Inventors: Toshiki Yamagata, Tokyo (JP); Kenichi Takahashi, Tokyo (JP); Hiroki Ihara, Tokyo (JP)

(73) Assignee: Hitachi High-Technologies Corporation, Tokyo (JP)

(*) Notice: Subject to any disclaimer, the term of this patent is extended or adjusted under 35 U.S.C. 154(b) by 250 days.

(21) Appl. No.: 15/564,457

(22) PCT Filed: Feb. 26, 2016

(86) PCT No.: PCT/JP2016/055937
§ 371 (c)(1),
(2) Date: Oct. 5, 2017

(87) PCT Pub. No.: WO2016/163173
PCT Pub. Date: Oct. 13, 2016

(65) Prior Publication Data
US 2018/0074085 A1   Mar. 15, 2018

(30) Foreign Application Priority Data

Apr. 7, 2015  (JP) ................ 2015-078354

(51) Int. Cl.
*G01N 35/02* (2006.01)
*G01N 35/04* (2006.01)
*G01N 35/00* (2006.01)

(52) U.S. Cl.
CPC ....... *G01N 35/026* (2013.01); *G01N 35/0099* (2013.01); *G01N 35/04* (2013.01);
(Continued)

(58) Field of Classification Search
CPC .. G01N 35/026; G01N 35/0099; G01N 35/04; G01N 2035/0415;
(Continued)

(56) References Cited

U.S. PATENT DOCUMENTS 6,827,902 B1 * 12/2004 Kuriyama ............ G01N 35/026
                                                                422/424
6,919,044 B1 *  7/2005 Shibata ............... G01N 35/0092
                                                                 422/63

(Continued)

FOREIGN PATENT DOCUMENTS

JP   04-252960 A    9/1992
JP   11-083864 A    3/1999
(Continued)

OTHER PUBLICATIONS

International Search Report of PCT/JP2016/055937 dated May 24, 2016.

(Continued)

*Primary Examiner* — Benjamin R Whatley
*Assistant Examiner* — Curtis A Thompson
(74) *Attorney, Agent, or Firm* — Mattingly & Malur, PC

(57) ABSTRACT

A connection unit connects one end of each of two processing systems and includes a processing unit for carrying out necessary processing on a specimen in a specimen container held by a specimen holding rack. The first and second processing systems each have an opening and closing part that can be opened and closed to expose an access surface for an operator. The connection unit is configured so as to connect the first and second processing systems in such a way that a distance along a horizontal plane from the access surface of the first processing system to the one end of the second processing system is longer than a distance by which the opening and closing part of the first processing system (Continued)

moves when opening and closing. Thus, various layouts resulting from the structure are possible within an inspection room without diminishing the ease of operation.

6 Claims, 13 Drawing Sheets

(52) U.S. Cl.
CPC .............. *G01N 2035/00306* (2013.01); *G01N 2035/0401* (2013.01); *G01N 2035/0415* (2013.01); *G01N 2035/0467* (2013.01); *G01N 2035/0498* (2013.01)

(58) Field of Classification Search
CPC ... G01N 2035/0498; G01N 2035/0401; G01N 2035/00306; G01N 2035/0467; G01N 2035/00326; G01N 35/025; Y10T 436/114165; Y10T 436/112499; Y10T 436/113332
See application file for complete search history.

(56) References Cited

U.S. PATENT DOCUMENTS

| | | | | |
|---|---|---|---|---|
| 9,651,570 | B2* | 5/2017 | Yagi | ........................ B04B 9/146 |
| 2010/0129789 | A1* | 5/2010 | Self | .......................... B01L 9/06 |
| | | | | 435/5 |
| 2011/0045521 | A1* | 2/2011 | Itoh | ........................ G01N 35/04 |
| | | | | 435/29 |

FOREIGN PATENT DOCUMENTS

| | | |
|---|---|---|
| JP | 2001-99844 A | 4/2001 |
| JP | 2012-073203 A | 4/2012 |
| WO | 98/18009 A1 | 4/1998 |

OTHER PUBLICATIONS

Extended European Search Report received in corresponding European Application No. 16776342.4 dated Dec. 5, 2018.
International Preliminary Report on Patentability received in corresponding International Application No. PCT/JP2016/055937 dated Oct. 19, 2017.

* cited by examiner

[FIG. 1]
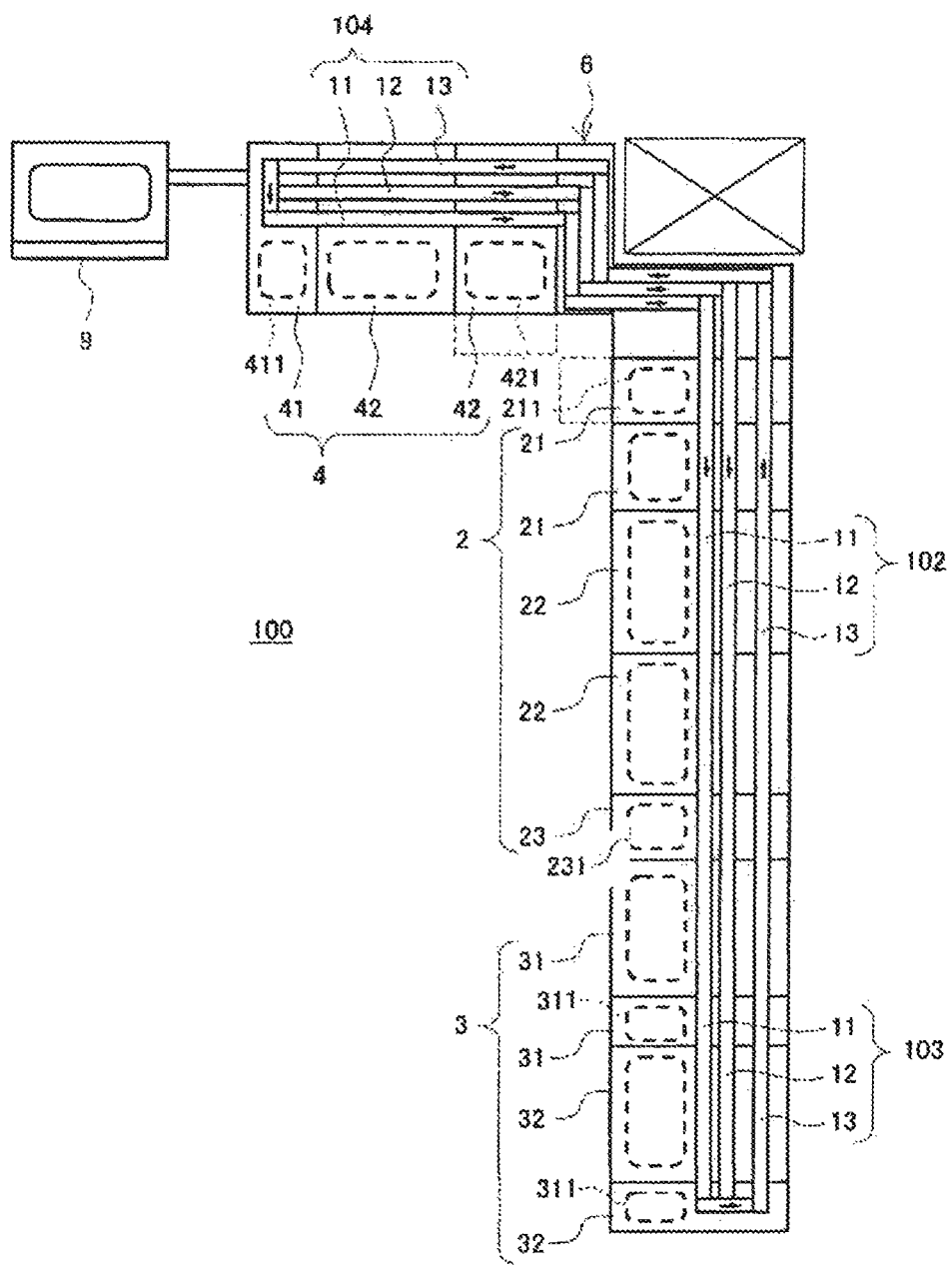

[FIG. 2]
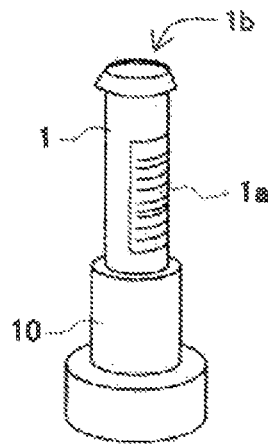
[FIG. 3]
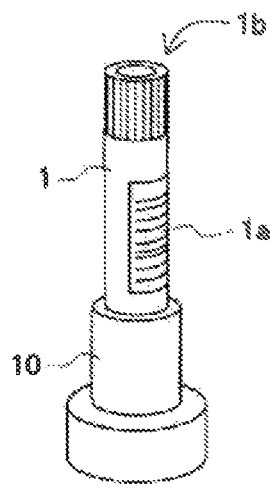
[FIG. 4]
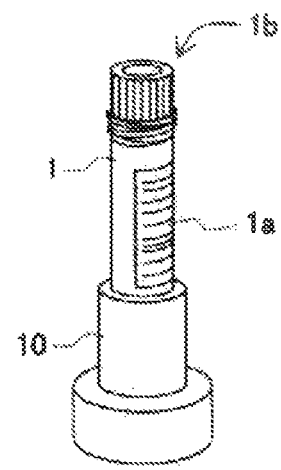

[FIG. 5]
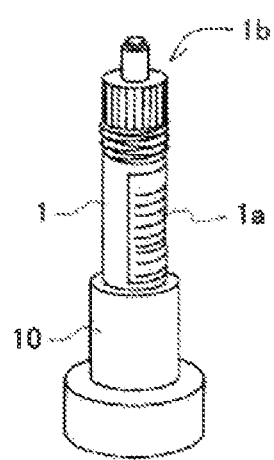
[FIG. 6]
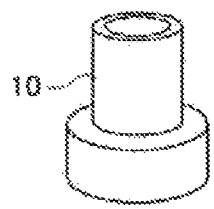

[FIG 7]
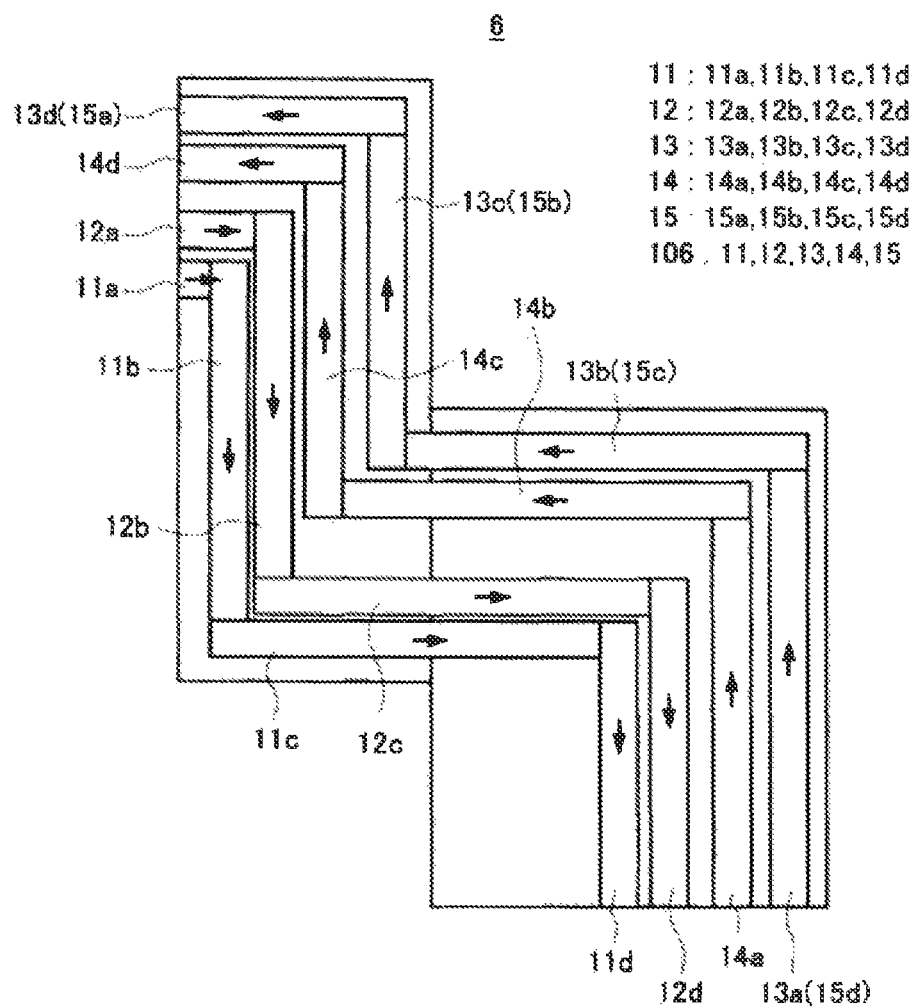

[FIG. 8]
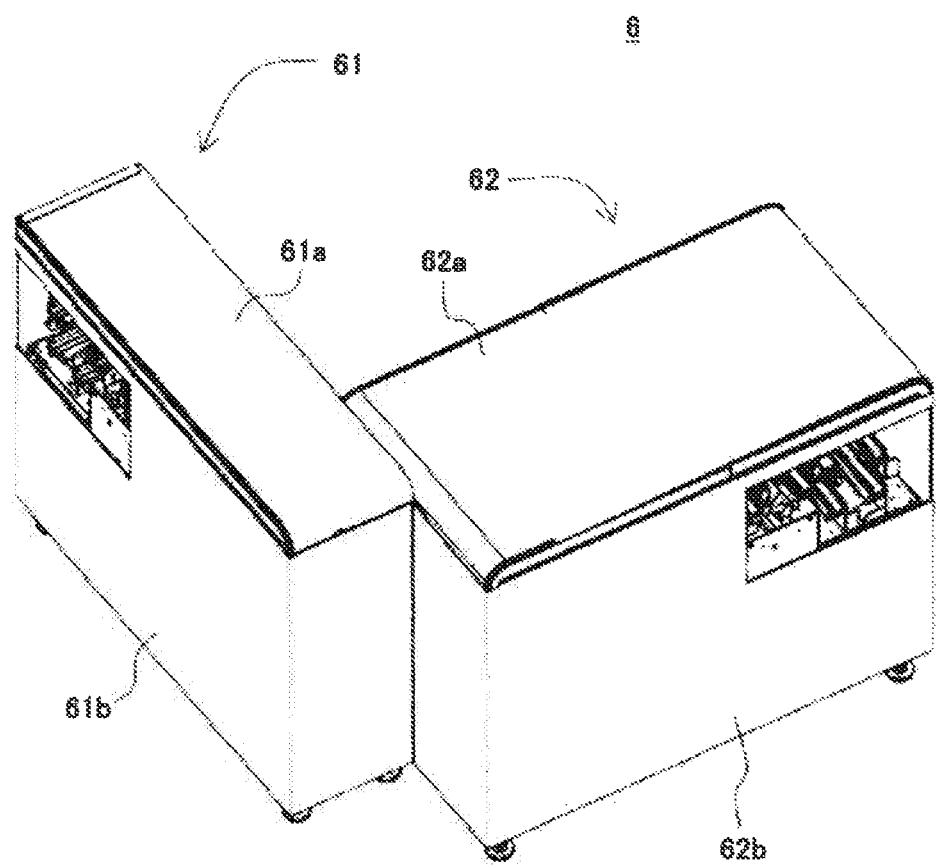

[FIG. 9]
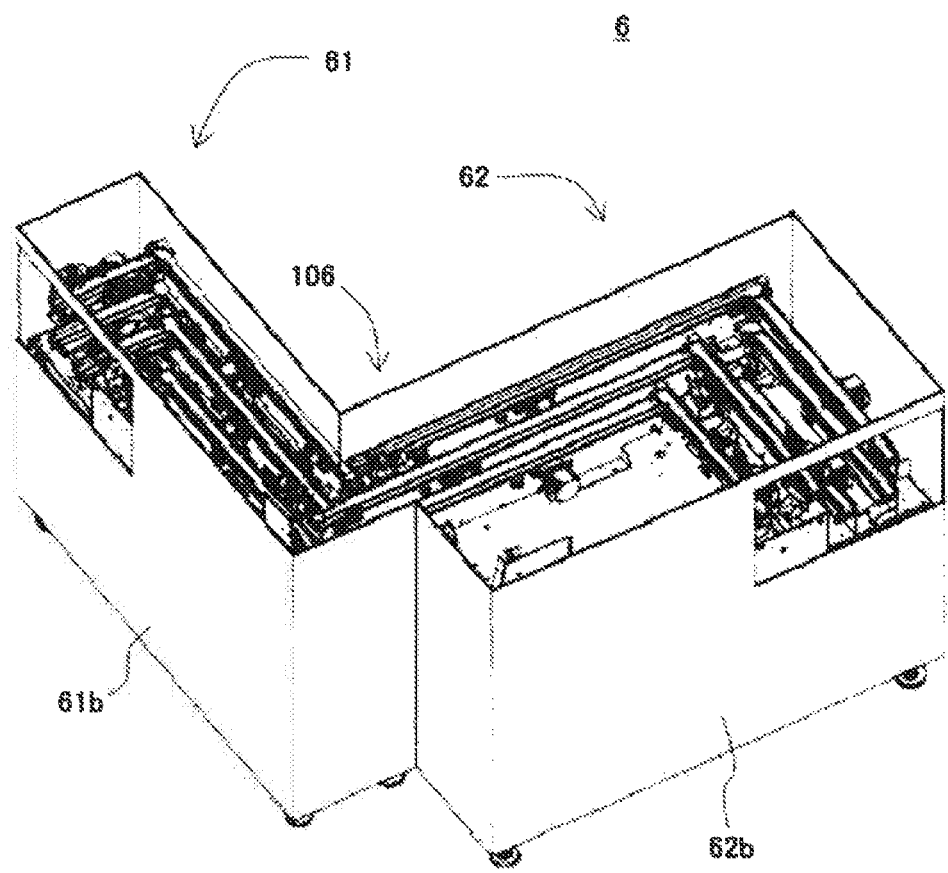

[FIG. 10]
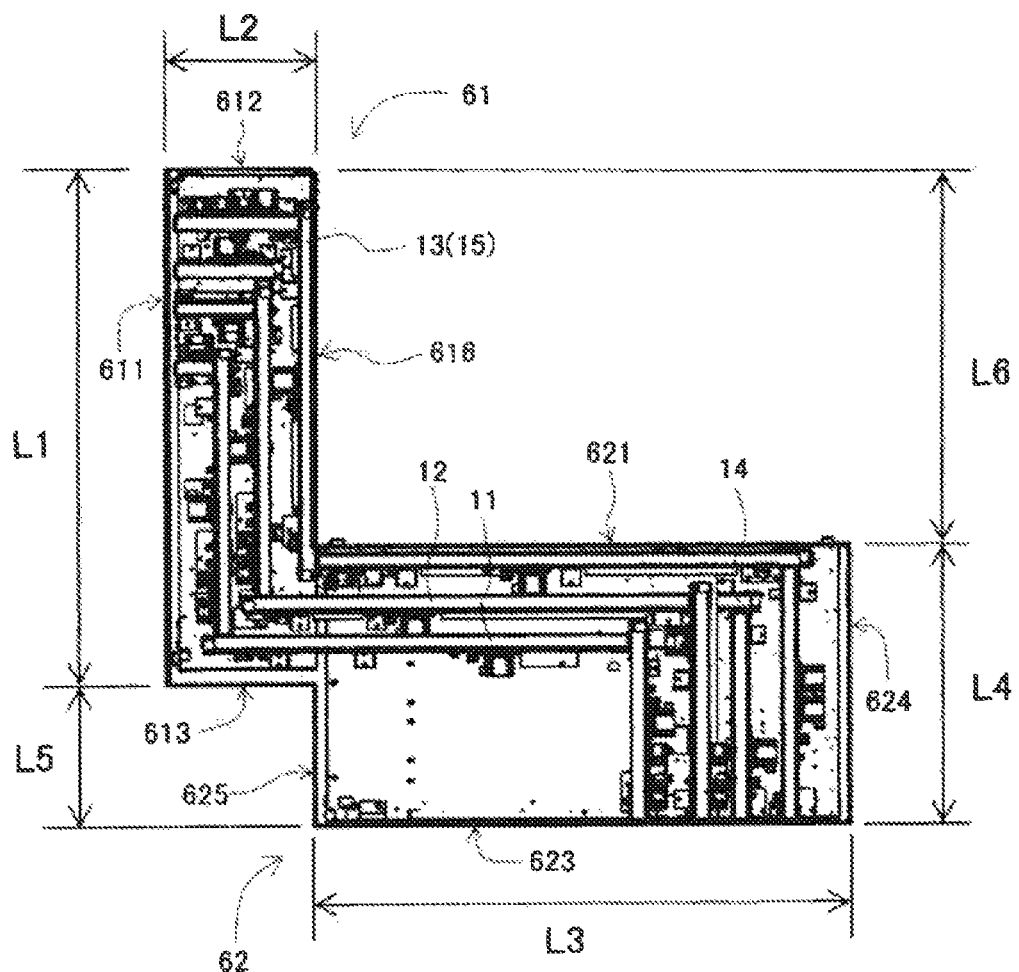

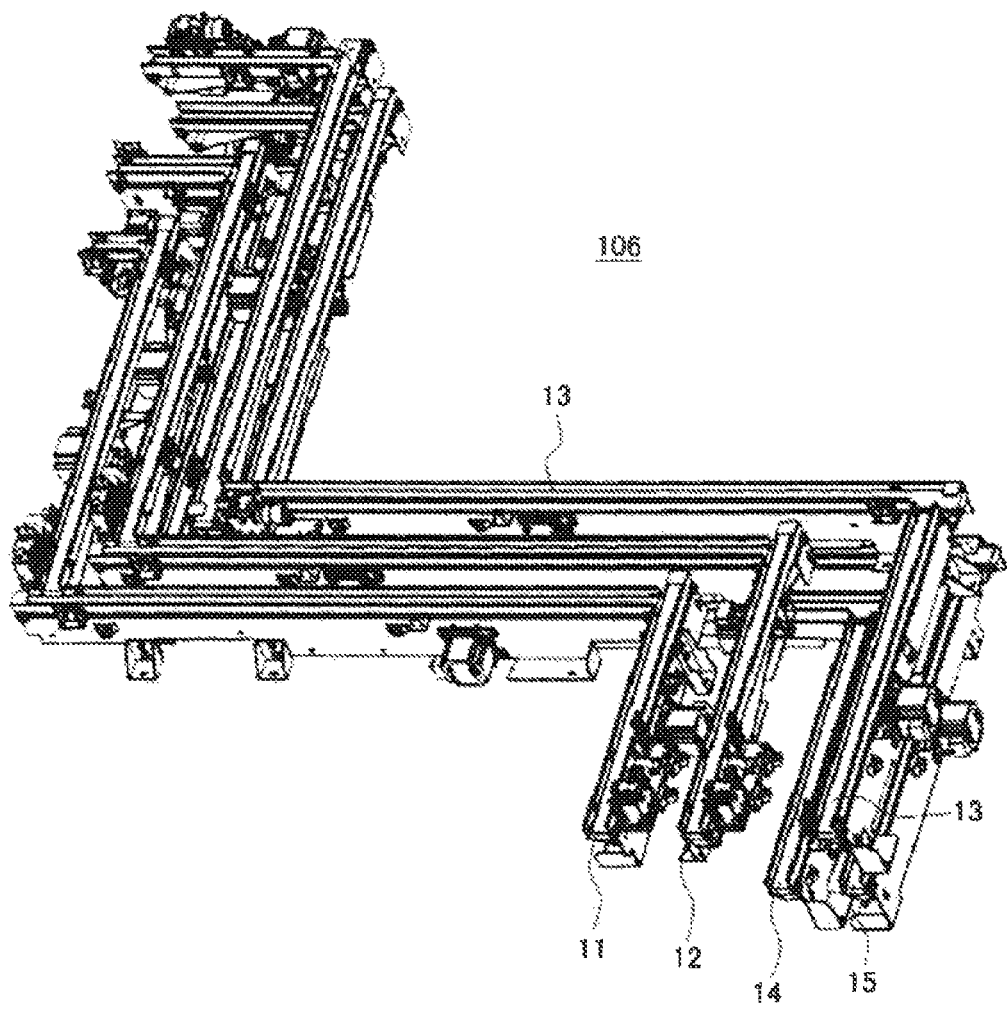
[FIG. 11]

[FIG. 12]
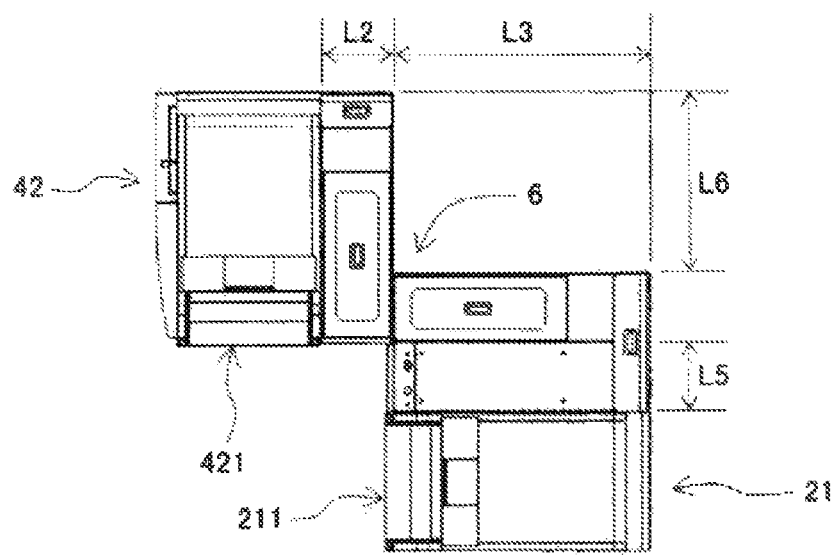
[FIG. 13]
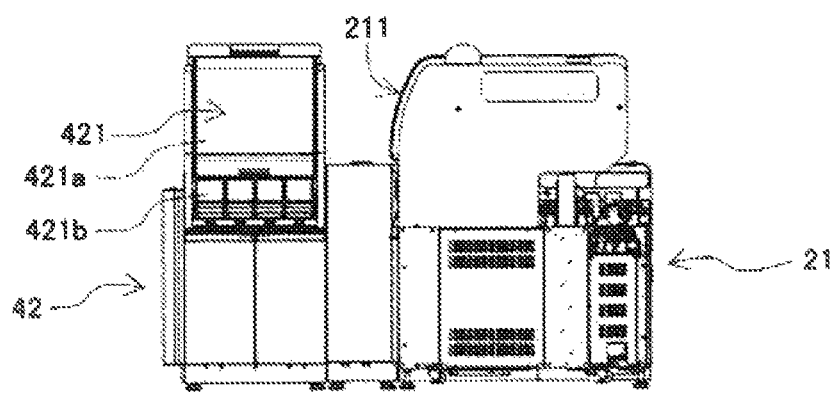

[FIG. 14]
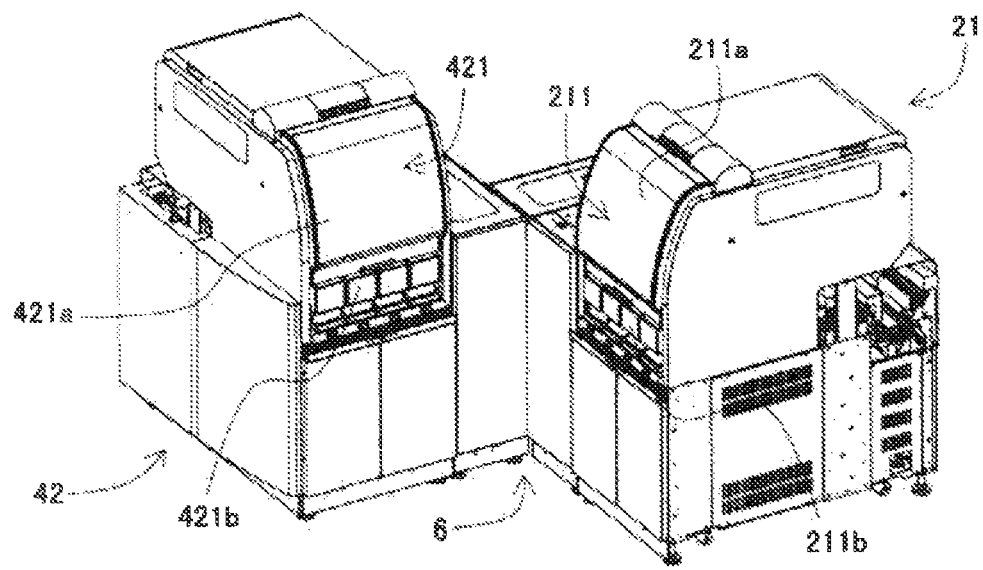
[FIG. 15]
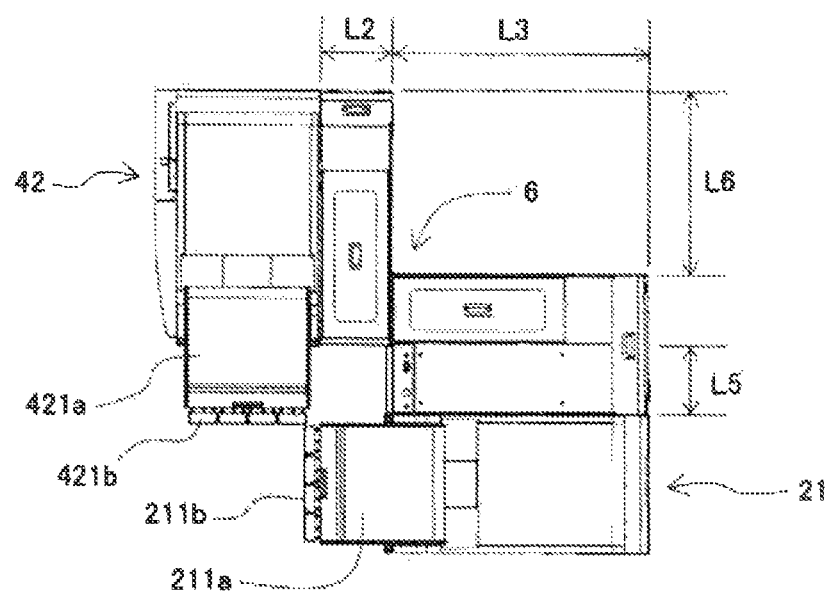

[FIG. 16]
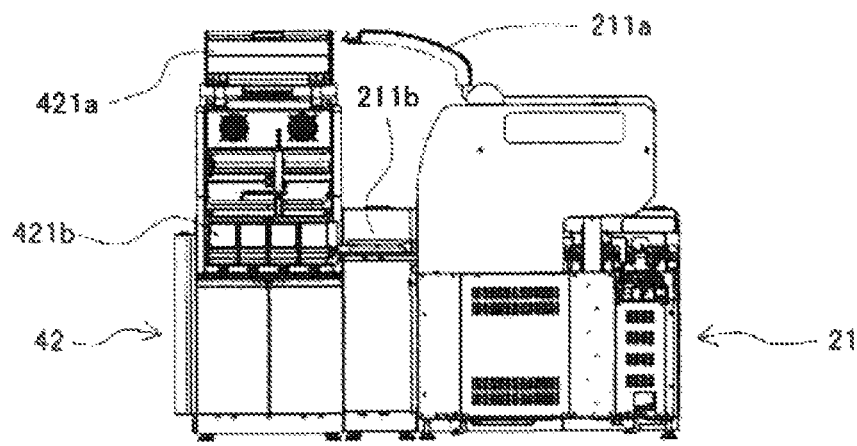
[FIG. 17]
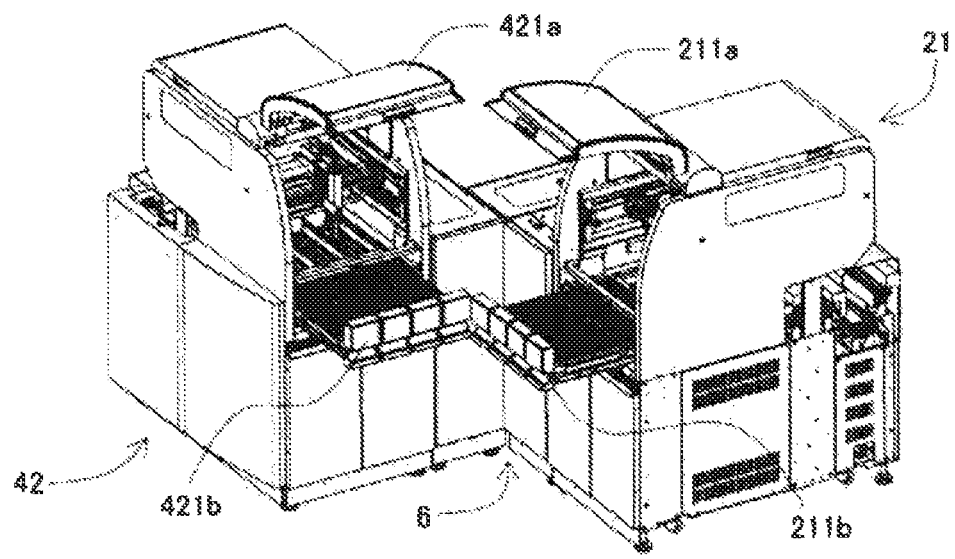

[FIG. 18]
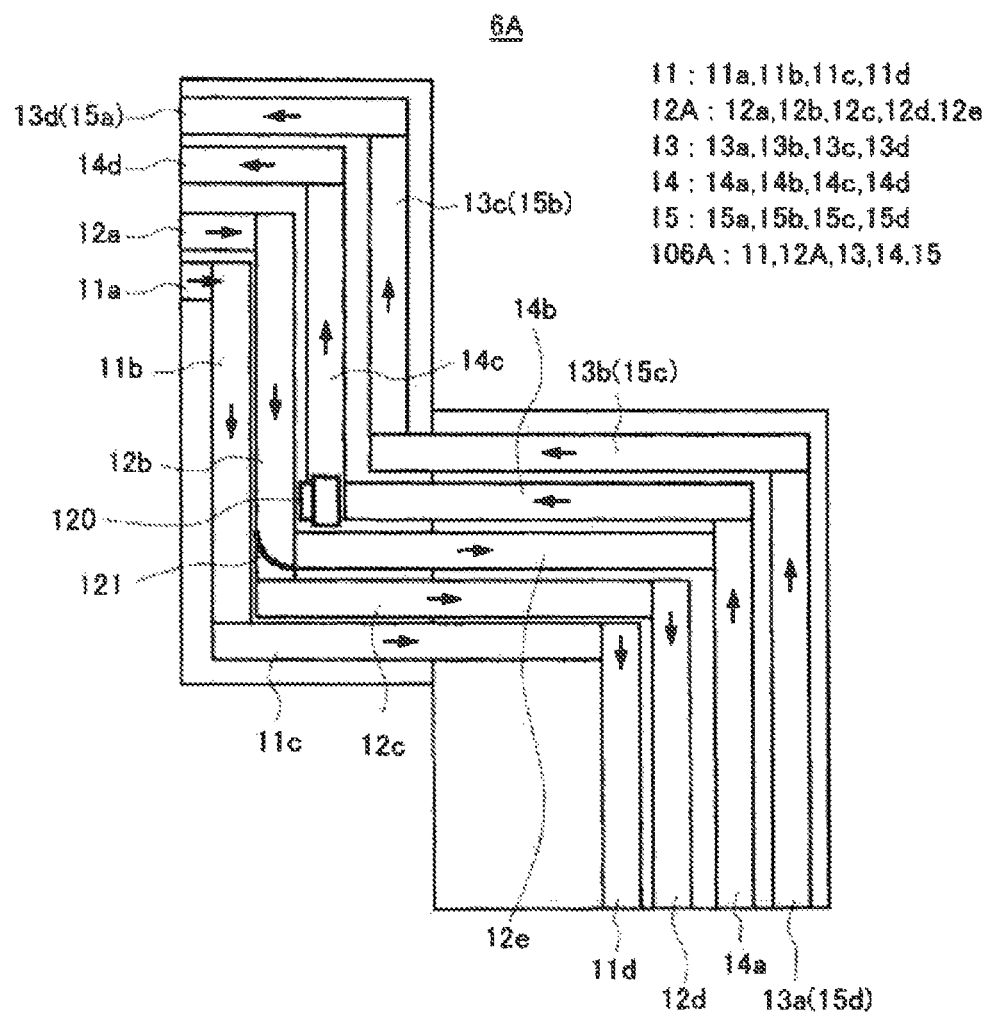

[FIG. 19]
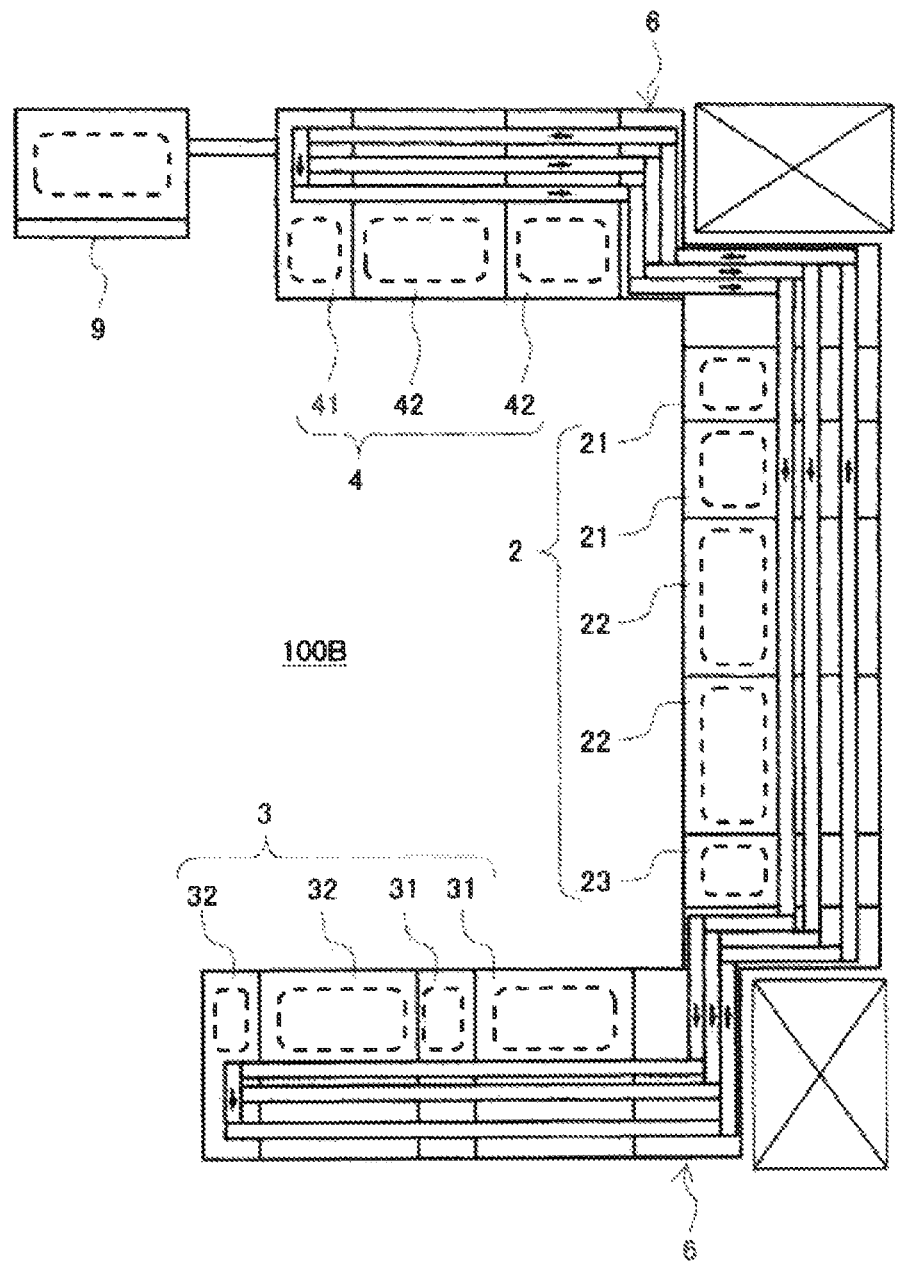

SPECIMEN CONVEYANCE DEVICE AND SPECIMEN PROCESSING SYSTEM

TECHNICAL FIELD

The present invention relates to a specimen conveyance device which conveys a biological sample such as blood or urine, as a specimen, and a specimen processing system which carries out preprocessing for carrying out qualitative and quantitative analysis of a specimen.

BACKGROUND ART

In the case of carrying out qualitative and quantitative analysis of a specific component contained in a biological sample (hereinafter referred to as a specimen) such as blood or urine with an automatic analysis device, it is necessary to carry out various kinds of processing (preprocessing) in advance in order to turn the specimen into a state suitable for the analysis.

As a technique related to such specimen processing, for example, PTL 1 (JP-A-2013-108955) discloses a specimen preprocessing device for carrying out a preprocessing process necessary for analyzing a specimen such as blood or urine in the case of analyzing the specimen, the device including: a plurality of modules for carrying out the preprocessing process; and a circular sector line with variable center angles for connecting the plurality of modules with each other and conveying a rack where the specimen is installed, from a preceding module to a subsequent module.

CITATION LIST

Patent Literature

PTL 1: JP-A-4-252960

SUMMARY OF INVENTION

Technical Problem

Incidentally, as an increase in the scale of the specimen processing system has been underway recently, it is demanded that the processing unit forming the specimen processing system should be arranged efficiently in a limited space within an inspection room.

However, if modules forming the specimen preprocessing device are simply connected by a connection line in the shape of a circular sector as in the related-art technique, it is difficult to respond to a variety of layout requests resulting from the structure within the inspection room without diminishing the ease of operation for the operator.

In view of the foregoing, an object of the present invention is to provide a specimen conveyance device and a specimen processing system that can respond to a variety of layout requests resulting from the structure within the inspection room without diminishing the ease of operation for the operator.

Solution to Problem

In order to achieve the foregoing object, according to the invention, a specimen conveyance device includes at least one connection unit that connects one end of each of first and second processing systems which includes a processing unit for carrying out necessary processing on a specimen in a specimen container held by a specimen holding rack. The processing unit has an opening and closing part that can be opened and closed to an access surface for an operator. The connection unit is configured to connect the first processing system and the second processing system in such a way that a distance along a horizontal plane from the access surface of the first processing system to the one end of the second processing system is longer than a distance by which the opening and closing part of the first processing system moves when opening and closing and that a distance along a horizontal plane from a front surface of the second processing system to the one end of the first processing system is longer than a distance by which the opening and closing part of the second processing system moves when opening and closing.

Advantageous Effects of Invention

According to the invention, it is possible to respond to a variety of layout requests resulting from the structure within the inspection room without diminishing the ease of operation for the operator.

BRIEF DESCRIPTION OF DRAWINGS

FIG. 1 is a view schematically showing the overall configuration of a specimen processing system according to a first embodiment.

FIG. 2 is a view showing an example of a specimen container and a specimen holding rack and showing the state where the specimen container is held by the specimen holding rack.

FIG. 3 is a view showing another example of the specimen container and the specimen holding rack and showing the state where the specimen container is held by the specimen holding rack.

FIG. 4 is a view showing another example of the specimen container and the specimen holding rack and showing the state where the specimen container is held by the specimen holding rack.

FIG. 5 is a view showing another example of the specimen container and the specimen holding rack and showing the state where the specimen container is held by the specimen holding rack.

FIG. 6 is a view showing the specimen holding rack for holding the specimen container.

FIG. 7 is a view selectively and schematically showing a connection unit in FIG. 1.

FIG. 8 is a perspective view showing the appearance of a configuration example of the connection unit.

FIG. 9 is a perspective view showing the case where a top cover of the connection unit is removed.

FIG. 10 is a top view showing the case where the top cover of the connection unit is removed.

FIG. 11 is a perspective view selectively showing a rack conveyance path group of the connection unit.

FIG. 12 is a top view selectively showing the connection unit, and a specimen input unit and a specimen classification and housing unit connected to both sides of the connection unit, and showing the state where the door mechanisms of specimen access parts of the specimen input unit and the specimen classification and housing unit are closed.

FIG. 13 is a front view selectively showing the connection unit, and the specimen input unit and the specimen classification and housing unit connected to both sides of the connection unit, and showing the state where the door mechanisms of the specimen access parts of the specimen input unit and the specimen classification and housing unit are closed.

FIG. 14 is a perspective view selectively showing the connection unit, and the specimen input unit and the specimen classification and housing unit connected to both sides of the connection unit, and showing the state where the door mechanisms of the specimen access parts of the specimen input unit and the specimen classification and housing unit are closed.

FIG. 15 is a top view selectively showing the connection unit, and the specimen input unit and the specimen classification and housing unit connected to both sides of the connection unit, and showing the state where the door mechanisms of the specimen access parts of the specimen input unit and the specimen classification and housing unit are open.

FIG. 16 is a front view selectively showing the connection unit, and the specimen input unit and the specimen classification and housing unit connected to both sides of the connection unit, and showing the state where the door mechanisms of the specimen access parts of the specimen input unit and the specimen classification and housing unit are open.

FIG. 17 is a perspective view selectively showing the connection unit, and the specimen input unit and the specimen classification and housing unit connected to both sides of the connection unit, and showing the state where the door mechanisms of the specimen access parts of the specimen input unit and the specimen classification and housing unit are open.

FIG. 18 is a view selectively and schematically showing a connection unit in a second embodiment.

FIG. 19 is a view schematically showing the overall configuration of a specimen processing system according to a third embodiment.

DESCRIPTION OF EMBODIMENTS

Embodiments of the invention will be described, referring to the drawings.

First Embodiment

A first embodiment of the invention will be described in detail, referring to FIGS. 1 to 17.

FIG. 1 is a view schematically showing the overall configuration of a specimen processing system according to this embodiment.

In FIG. 1, a specimen processing system 100 is schematically configured of: a specimen input block 2 as a processing system including a specimen input unit 21, a centrifuge unit 22 and a stopper opening unit 23; a specimen dispensing block 3 as a processing system including a barcode pasting unit 31 and a dispensing unit 32; a specimen classification and housing block 4 as a processing system including a stopper closing unit 41 and a specimen classification and housing unit 42; a connection unit 6; and an operation unit 9.

The operation unit 9 is configured to control operations of the entirety of the specimen processing system 100 and controls operations of the specimen input block 2, the specimen dispensing block 3, the specimen classification and housing block 4 and the connection unit 6, including rack conveyance paths 11 to 15 (described later).

The specimen input block 2 has a rack conveyance path group 102 made up of a plurality of rack conveyance paths 11 to 15 conveyed so as to be arranged parallel to a specimen holding rack 10 holding a specimen container 1 housing a biological sample (hereinafter referred to as a specimen) such as blood or urine as an object to be analyzed, that is, a specimen holding rack main conveyance path 11 which conveys a specimen container 1 housing a general specimen with no urgency, a specimen holding rack fast-track conveyance path 12 which conveys a specimen container 1 housing an urgent specimen which is to be processed preferentially, a specimen holding rack return conveyance path 13 which conveys a specimen container 1 in which processing is finished, an empty rack main conveyance path 14 which conveys an empty specimen holding rack 10 holding no specimen container 1 to a desired processing unit, and an empty rack return conveyance path 15 which conveys an empty specimen holding rack 10 which is not used for processing. The specimen input unit 21, the centrifuge unit 22 and the stopper opening unit 23 are arranged in a straight line along the rack conveyance path group 102. In FIG. 1, the rack conveyance paths 14, 15 are not illustrated.

FIGS. 2 to 6 are views showing a specimen container housing a specimen to be analyzed, and a specimen holding rack holding the specimen container. FIGS. 2 to 5 are views showing the state where various specimen containers are held by the specimen holding rack. FIG. 6 is a view showing the specimen holding rack only.

As shown in FIGS. 2 to 6, as the specimen container 1, there are various types according to the use, and the specimen container 1 is sealed by a stopper 1b. A barcode 1a or the like is attached to the specimen container 1 as an identification mark. The specimen container 1, in the state of being inserted in and held by the specimen holding rack 10, is conveyed within the specimen processing system 100.

The specimen input unit 21 is a processing unit for inputting the specimen container 1 housing a specimen to be analyzed and the specimen holding rack 10 holding the specimen container 1, to the specimen processing system 100, and has the function of reading the shape of the specimen container 1 inputted therein or the identification mark (for example, a barcode) attached to the specimen container 1 and thus recognizing the specimen. The specimen input unit 21 has a specimen access part 211 (opening and closing part) for an operator to have access inside the specimen input unit 21. The specimen container 1, inputted to the specimen input unit 21 by the operator via the specimen access part 211, is conveyed downstream to the centrifuge unit 22 via the rack conveyance path group 102 when the processing by the specimen input unit 21 is finished.

The centrifuge unit 22 is a processing unit having the function of carrying out centrifugal separation of the specimen, for example, blood, housed in the specimen container 1 and thus separating a serum. The specimen container 1 is conveyed downstream to the stopper opening unit 23 via the rack conveyance path group 102 when the processing by the centrifuge unit 22 is finished.

The stopper opening unit 23 is a processing unit having the function of removing a stopper closing the opening of the specimen container 1 and thus opening the specimen container 1. The stopper removed from the specimen container 1 is collected by the operator via a stopper disposal access part 231. The specimen container 1 is conveyed to the specimen dispensing block 3 via rack conveyance path groups 102, 103 when the processing by the stopper opening unit 23 is finished.

The specimen dispensing block 3 has the rack conveyance path group 103 made up of the plurality of rack conveyance paths 11 to 15 arranged in parallel which convey the specimen holding rack 10 holding the specimen container 1 housing a specimen to be analyzed. The barcode pasting unit 31 and the dispensing unit 32 are arranged in a straight line along the rack conveyance path group 103.

The barcode pasting unit 31 is a processing unit having the function of attaching a barcode label as an identification mark to the specimen container 1 (sub specimen container (sub test tube)) inputted by the operator via a disposables supply unit 311.

The dispensing unit 32 is a processing unit having the function of dispensing the specimen housed in the specimen container 1 (main specimen container) to the specimen container 1 (sub specimen container), for analysis processing by an analysis device (not illustrated) which carries out analysis of the specimen, or for classification and storage of the specimen. Disposables such as chips and cups used for dispensing processing by the dispensing unit 32 are supplied by the operator via a disposables supply unit 311. Also, the empty specimen holding rack 10 is supplied via the empty rack main conveyance path 14. The specimen container 1 (main specimen container, sub specimen container) is conveyed to the specimen classification and housing block 4 via rack conveyance path groups 102 to 104 when the processing by the dispensing unit 32 is finished.

The specimen classification and housing block 4 has the rack conveyance path group 104 made up of the plurality of rack conveyance paths 11 to 15 arranged in parallel which convey the specimen holding rack 10 holding the specimen container 1 housing a specimen to be analyzed. The stopper closing unit 41 and the specimen classification and housing unit 42 are arranged in a straight line along the rack conveyance path group 104.

The stopper closing unit 41 is a processing unit having the function of automatically closing the stopper and thus sealing the specimen container 1 (main specimen container) or the specimen container 1 (sub specimen container) for storage in which the specimen is dispensed by the dispensing unit 32. The specimen container 1 is conveyed to the specimen classification and housing unit 42 via the rack conveyance path group 104 after the stopper closing processing. The stopper used to seal the specimen container 1 by the stopper closing unit 41 is supplied by the operator via a disposables supply unit 411.

The specimen classification and housing unit 42 is a processing unit having the function of classifying and housing the specimen container 1 (sub specimen container) in which the specimen is dispensed by the dispensing unit 32, according to the use (purpose of inspection). The specimen classification and housing unit 42 has a specimen access part 421 (opening and closing part) for the operator to have access inside the specimen classification and housing unit 42. The specimen container 1 classified and housed by the specimen classification and housing unit 42 is conveyed outward by the operator via the specimen access part 421, then inputted into the analysis device, and subjected to analysis.

FIG. 7 is a view selectively and schematically showing the connection unit in FIG. 1. FIGS. 8 to 11 are views showing a configuration example of the connection unit. FIG. 8 is perspective view showing the appearance. FIG. 9 is a perspective view in the case where a top cover is removed. FIG. 10 is a top view in the case where the top cover is removed. FIG. 11 is a perspective view selectively showing the rack conveyance path group.

As shown in FIGS. 7 to 11, the connection unit 6 is made up of a first connection unit 61 to which one end of the rack conveyance path group 104 in the specimen classification and housing block 4 is connected, and a second connection unit 62 connected to one end of the rack conveyance path group 102 in the specimen input block 2. The first connection unit 61 and the second connection unit 62 are configured to be separable and connectable and therefore can be easily installed or rearranged in the inspection room of the specimen processing system 100.

The first and second connection units 61, 62 are covered by exterior covers 61b, 62b and top covers 61a, 62a to prevent entry of dust or the like into the units or prevent the operator from touching the internal mechanisms or the specimen or the like. The top covers 61a, 62a of the first and second connection units 61, 62 are provided in such a way as to be removable when access inside the connection unit 6 is needed at the time of maintenance or the like.

The first connection unit is formed substantially in a rectangular parallelepiped shape. As shown in FIG. 10, a width L1 of a surface 611 connected to the specimen classification and housing block 4 is set to be equal to the width (depth) of a connection surface in the specimen classification and housing block 4. Similarly, the second connection unit is formed substantially in a rectangular parallelepiped shape. A width L3 of a surface 623 connected to the specimen input block 2 is set to be equal to the width (depth) of a connection surface of the specimen input block 2. Then, as a part of a surface 625 on the front side (the side accessed by the operator) of the specimen input block 2, of the second connection unit 62, is connected to a surface 616 on the side opposite to the specimen classification and housing block 4, of the first connection unit 61, the first connection unit 61 and the second connection unit 62 form the connection unit 6 in a unified manner.

A surface 613 on the front side (the side accessed by the operator) of the specimen classification and housing block 4, of the first connection unit, is set to a width L2. That is, the end surface on the side of the connection unit 6, of the specimen classification and housing block 4, and the front surface of the specimen input block 2, are set at a distance L2.

Also, the surface 616 of the first connection unit and the surface 625 of the second connection unit are connected with a shift toward the surface 623 (toward the specimen input block 2) in such a way that the surface 625 protrudes toward the surface 623 (toward the specimen input block 2) by a width L5. That is, the end surface on the side of the connection unit 6, of the specimen input block 2, and the front surface of the specimen classification and housing block 4, are set at a distance L5. Also, if the surface 625 has a width L4, 0 (zero) L5<L4 holds and the surface 616 of the first connection unit and the surface 625 of the second connection unit are connected across a width of L4−L5.

Also, the surface 616 of the first connection unit is set in such a way as to be exposed by a width L6, and in such a way that 0 (zero)<L6<L1 holds. That is, the surface 616 of the first connection unit and the surface 625 of the second connection unit are connected across a width of L1-L6 (=L4−L5).

In the connection unit 6 configured as described above, the widths L2, L5 are set in such away that the movement ranges of door mechanisms 211a, 421a (or drawer mechanisms 211b, 421b) of the opening and closing parts (the specimen access parts 211, 421) of the processing units (the specimen input unit 21 and the specimen classification and housing unit 42) connected to adjacent to both sides thereof do not overlap each other and that access inside each processing unit by the operator can be achieved from outside the movement range of the other door mechanism 211a, 421a (or the drawer mechanism 211b, 421b), as described later with reference to FIGS. 12 to 17 below. Also, the widths L6, L3 are set in such a way that the specimen processing system 100 can be arranged, avoiding an obstacle (for example, a column or the like which is a structure of the inspection room) existing at a position where the arrangement of the processing units forming the specimen processing system 100 is bent by 90 degrees, that is, at the position of the connection unit 6.

Also, it is not the case that larger L2, L5 are preferred. If these distances are too long, the system as a whole becomes large-scale, and when the user sequentially accesses each processing unit, the line of flow of the user becomes unnecessarily long, causing the exhaustion of the user in terms of time and stamina. Therefore, L2 and L5 may be set to such distances that, when the door mechanisms are simultaneously opened, the respective mechanisms do not interfere with each other. Preferably, L2 and L5 are formed to be 300 to 450 cm. Thus, the neighboring mechanisms do not interfere with each other while the configuration of the device is compact.

Also, the connection unit 6 has a rack conveyance path group 106 made up of the plurality of rack conveyance paths 11 to 15 arranged in parallel which convey the specimen holding rack 10, that is, the specimen holding rack main conveyance path 11, the specimen holding rack fast-track conveyance path 12, the specimen holding rack return conveyance path 13, the empty rack main conveyance path 14 and the empty rack return conveyance path 15. The empty rack main conveyance path 14 and the empty rack return conveyance path 15 are arranged at a position (lower stage) below the arrangement level (upper stage) of the specimen holding rack main conveyance path 11, the specimen holding rack fast-track conveyance path 12 and the specimen holding rack return conveyance path 13 in view of avoiding an increase in the size of the system. Also, the empty rack return conveyance path 15 is arranged along the specimen holding rack return conveyance path 13, below the specimen holding rack return conveyance path 13, and in FIG. 7, its reference sign is shown in parentheses.

In FIG. 7, the specimen holding rack main conveyance path 11 is configured of: a rack conveyance path 11a which introduces, into the connection unit 6, the specimen holding rack 10 (holding the specimen container 1 housing a general specimen) conveyed from the specimen classification and housing block 4 connected to the upstream side in the specimen holding rack main conveyance path 11 of the connection unit 6; a rack conveyance path 11b which is connected to the downstream side of the rack conveyance path 11a at an angle of 90 degrees to the conveyance direction of the rack conveyance path 11a, receives the specimen holding rack 10 from the rack conveyance path 11a, and conveys the specimen holding rack 10, changing the conveyance direction of the rack conveyance path 11a by 90 degrees; a rack conveyance path 11c which is connected to the downstream side of the rack conveyance path 11b at an angle of 90 degrees to the conveyance direction of the rack conveyance path 11b, receives the specimen holding rack 10 from the rack conveyance path 11b, and conveys the specimen holding rack 10, changing the conveyance direction of the rack conveyance path 11b by 90 degrees; and a rack conveyance path 11d which is connected to the downstream side of the rack conveyance path 11c at an angle of 90 degrees to the conveyance direction of the rack conveyance path 11c, receives the specimen holding rack 10 from the rack conveyance path 11c, conveys the specimen holding rack 10, changing the conveyance direction of the rack conveyance path 11c by 90 degrees, and delivers the specimen holding rack 10 to the specimen input block 2 connected to the downstream side in the specimen holding rack main conveyance path 11 of the connection unit 6.

Similarly, the specimen holding rack fast-track conveyance path 12 is configured of: a rack conveyance path 12a which introduces, into the connection unit 6, the specimen holding rack 10 (holding the specimen container 1 housing an urgent specimen) conveyed from the specimen classification and housing block 4 connected to the upstream side in the specimen holding rack fast-track conveyance path 12 of the connection unit 6; a rack conveyance path 12b which is connected to the downstream side of the rack conveyance path 12a at an angle of 90 degrees to the conveyance direction of the rack conveyance path 12a, receives the specimen holding rack 10 from the rack conveyance path 12a, and conveys the specimen holding rack 10, changing the conveyance direction of the rack conveyance path 12a by 90 degrees; a rack conveyance path 12c which is connected to the downstream side of the rack conveyance path 12b at an angle of 90 degrees to the conveyance direction of the rack conveyance path 12b, receives the specimen holding rack 10 from the rack conveyance path 12b, and conveys the specimen holding rack 10, changing the conveyance direction of the rack conveyance path 12b by 90 degrees; and a rack conveyance path 12d which is connected to the downstream side of the rack conveyance path 12c at an angle of 90 degrees to the conveyance direction of the rack conveyance path 12c, receives the specimen holding rack 10 from the rack conveyance path 12c, conveys the specimen holding rack 10, changing the conveyance direction of the rack conveyance path 12c by 90 degrees, and delivers the specimen holding rack 10 to the specimen input block 2 connected to the downstream side in the specimen holding rack fast-track conveyance path 12 of the connection unit 6.

Meanwhile, the specimen holding rack return conveyance path 13 is configured of: a rack conveyance path 13a which introduces, into the connection unit 6, the specimen holding rack 10 (holding the specimen container 1) conveyed from the specimen input block 2 connected to the upstream side in the specimen holding rack return conveyance path 13 of the connection unit 6; a rack conveyance path 13b which is connected to the downstream side of the rack conveyance path 13a at an angle of 90 degrees to the conveyance direction of the rack conveyance path 13a, receives the specimen holding rack 10 from the rack conveyance path 13a, and conveys the specimen holding rack 10, changing the conveyance direction of the rack conveyance path 13a by 90 degrees; a rack conveyance path 13c which is connected to the downstream side of the rack conveyance path 13b at an angle of 90 degrees to the conveyance direction of the rack conveyance path 13b, receives the specimen holding rack 10 from the rack conveyance path 13b, and conveys the specimen holding rack 10, changing the conveyance direction of the rack conveyance path 13b by 90 degrees; and a rack conveyance path 13d which is connected to the downstream side of the rack conveyance path 13c at an angle of 90 degrees to the conveyance direction of the rack conveyance path 13c, receives the specimen holding rack 10 from the rack conveyance path 13c, conveys the specimen holding rack 10, changing the conveyance direction of the rack conveyance path 13c by 90 degrees, and delivers the specimen holding rack 10 to the specimen classification and housing block 4 connected to the downstream side in the specimen holding rack return conveyance path 13 of the connection unit 6.

Similarly, the empty rack main conveyance path 14 is configured of: a rack conveyance path 14a which introduces, into the connection unit 6, the empty specimen holding rack 10 conveyed from the specimen input block 2 connected to the upstream side in the empty rack main conveyance path 14 of the connection unit 6; a rack conveyance path 14b which is connected to the downstream side of the rack conveyance path 14a at an angle of 90 degrees to the conveyance direction of the rack conveyance path 14a, receives the specimen holding rack 10 from the rack conveyance path 14a, and conveys the specimen holding rack 10, changing the conveyance direction of the rack conveyance path 14a by 90 degrees; a rack conveyance path 14c which is connected to the downstream side of the rack conveyance path 14b at an angle of 90 degrees to the conveyance direction of the rack conveyance path 14b, receives the specimen holding rack 10 from the rack conveyance path 14b, and conveys the specimen holding rack 10, changing the conveyance direction of the rack conveyance path 14b by 90 degrees; and a rack conveyance path 14d which is connected to the downstream side of the rack conveyance path 14c at an angle of 90 degrees to the conveyance direction of the rack conveyance path 14c, receives the specimen holding rack 10 from the rack conveyance path 14c, conveys the specimen holding rack 10, changing the conveyance direction of the rack conveyance path 14c by 90 degrees, and delivers the specimen holding rack 10 to the specimen classification and housing block 4 connected to the downstream side in the empty rack main conveyance path 14 of the connection unit 6.

Meanwhile, the empty rack return conveyance path 15 is configured of: a rack conveyance path 15a which introduces, into the connection unit 6, the empty specimen holding rack 10 conveyed from the specimen classification and housing block 4 connected to the upstream side in the empty rack return conveyance path 15 of the connection unit 6; a rack conveyance path 15b which is connected to the downstream side of the rack conveyance path 15a at an angle of 90 degrees to the conveyance direction of the rack conveyance path 15a, receives the specimen holding rack 10 from the rack conveyance path 15a, and conveys the specimen holding rack 10, changing the conveyance direction of the rack conveyance path 15a by 90 degrees; a rack conveyance path 15c which is connected to the downstream side of the rack conveyance path 15b at an angle of 90 degrees to the conveyance direction of the rack conveyance path 15b, receives the specimen holding rack 10 from the rack conveyance path 15b, and conveys the specimen holding rack 10, changing the conveyance direction of the rack conveyance path 15b by 90 degrees; and a rack conveyance path 15d which is connected to the downstream side of the rack conveyance path 15c at an angle of 90 degrees to the conveyance direction of the rack conveyance path 15c, receives the specimen holding rack 10 from the rack conveyance path 15c, conveys the specimen holding rack 10, changing the conveyance direction of the rack conveyance path 15c by 90 degrees, and delivers the specimen holding rack 10 to the specimen input block 2 connected to the downstream side in the empty rack return conveyance path 15 of the connection unit 6.

The distance between the rack conveyance paths 11b, 12b, 13c, 14c, 15b is configured to be shorter than the distance between the rack conveyance paths 11a, 12a, 13d, 14d, 15a. Similarly, the distance between the rack conveyance paths 11c, 12c, 13b, 14b, 15c is configured to be shorter than the distance between the rack conveyance paths 11d, 12d, 13a, 14a, 15d.

In the connection unit 6 configured as described above, the connection part between the rack conveyance path 11a and the rack conveyance path 11b, the connection part between the rack conveyance path 12a and the rack conveyance path 12b, the connection part between the rack conveyance path 13c and the rack conveyance path 13d, the connection part between the rack conveyance path 14c and the rack conveyance path 14d, and the connection part between the rack conveyance path 15a and the rack conveyance path 15b form a first conveyance direction changing unit which changes the conveyance direction of the specimen holding rack 10 by 90 degrees at one end of the rack conveyance path group 104 in the specimen classification and housing block 4. The connection part between the rack conveyance path 11c and the rack conveyance path 11d, the connection part between the rack conveyance path 12c and the rack conveyance path 12d, the connection part between the rack conveyance path 13a and the rack conveyance path 13b, the connection part between the rack conveyance path 14a and the rack conveyance path 14b, and the connection part between the rack conveyance path 15c and the rack conveyance path 15d form a second conveyance direction changing unit which changes the conveyance direction of the specimen holding rack 10 by 90 degrees at one end of the rack conveyance path group 102 in the specimen input block 2. The connection part between the rack conveyance path 11b and the rack conveyance path 11c, the connection part between the rack conveyance path 12b and the rack conveyance path 12c, the connection part between the rack conveyance path 13b and the rack conveyance path 13c, the connection part between the rack conveyance path 14b and the rack conveyance path 14c, and the connection part between the rack conveyance path 15b and the rack conveyance path 15c form a third conveyance direction changing unit which changes the conveyance direction of the specimen holding rack 10 by 90 degrees between the first conveyance direction changing unit and the second conveyance direction changing unit. The first and second conveyance direction changing units form a pitch changing unit which changes the space between the plurality of rack conveyance paths 11 to 15 of the rack conveyance path group 106.

Here, the opening/closing of the door mechanisms of the opening and closing parts of the processing units connected next to both sides of the connection unit will be described in detail, referring to FIGS. 12 to 17.

FIGS. 12 to 17 are views selectively showing the connection unit according to this embodiment, and the specimen input unit and the specimen classification and housing unit connected to both sides of the connection unit. FIGS. 12 to 14 are a top view, front view and perspective view, respectively, of the state where the door mechanisms of the specimen access parts of the specimen input unit and the specimen classification and housing unit are closed. Meanwhile, FIGS. 15 to 17 are a top view, front view and perspective view, respectively, of the state where the door mechanisms of the specimen access parts of the specimen input unit and the specimen classification and housing unit are opened.

As shown in FIGS. 12 to 17, when the specimen input unit 21 and the specimen classification and housing unit 42 are connected to both sides of the connection unit 6 according to this embodiment, the widths L2, L5 of the connection unit 6 are set in such a way that the movement ranges of the door mechanisms 211a, 421a (or drawer mechanisms 211b, 421b) of the specimen access parts 211, 421 (opening and closing parts) do not overlap each other. Therefore, with respect to the opening/closing of each door mechanism 211a, 421a (or drawer mechanism 211b, 421b) at the time of accessing the specimen access part 211, 421, the operator need not consider the opening and closing state of the other door mechanism. Moreover, the widths L2, L5 of the connection unit 6 are set in such a way that access inside each processing unit by the operator via specimen access part 211, 421 can be carried out from outside the movement range of the other door mechanism 211a, 421a (or drawer mechanism 211b, 421b). Therefore, it is possible to access inside each processing unit, regardless of the opening and closing state of the other door mechanism 211a, 421a (or drawer mechanism 211b, 421b). That is, access inside the specimen input unit 21 and the specimen classification and housing unit 42 connected to both side of the connection unit 6 can be carried out simultaneously.

Effects of this embodiment configured as described above will be described.

With an increase in the scale of the specimen processing system, it is demanded that the processing units forming the specimen processing system should be efficiently arranged in the limited space within the inspection room. However, if modules forming a specimen preprocessing device are simply connected by a connection line in the shape of a circular sector as in the related-art technique, it is difficult to respond to various layout requests resulting from the structure in the inspection room without diminishing the ease of operation for the operator.

In contrast, in this embodiment, at least one connection unit 6 connecting one end of each of the processing systems 2, 4 (specimen input block 2, specimen classification and housing block 4) including a processing unit which carries out necessary processing on a specimen in a specimen container held by the specimen holding rack 10 is provided. The processing systems 2, 4 have an opening and closing part that can be opened and closed to the access surface for the operator. The connection unit is configured so as to connect the processing system 2 and the processing system 4 in such a way that the distance along the horizontal plane from the access surface of the processing system 2 to the one end of the processing system 4 is longer than the distance by which the opening and closing part of the processing system 2 moves when opening and closing and that the distance along the horizontal plane from the front surface of the processing system 4 to the one end of the processing system 2 is longer than the distance by which the opening and closing part of the processing system 4 moves when opening and closing. Therefore, it is possible to respond to various layout requests resulting from the structure within the inspection room without diminishing the ease of operation for the operator.

Also, in this embodiment, in the specimen processing system 100 including: the plurality of rack conveyance path groups 102 to 104 made up of the plurality of rack conveyance paths 11 to 15 arranged in parallel which carry the specimen holding rack 10; the plurality of processing systems 2 to 4 configured respectively of processing units which are arranged in a straight line along the rack conveyance path groups 102 to 104 and which carry out necessary preprocessing on the specimen housed in the specimen container 1; and the connection unit 6 connecting one end of the rack conveyance path group 102 in the processing system 2 and one end of the rack conveyance path group 104 in the processing system 4, the connection unit 6 is configured to have the first conveyance direction changing unit which changes the conveyance direction of the specimen holding rack 10 by 90 degrees at the one end of the rack conveyance path group 104 in the processing system 4, the second conveyance direction changing unit which changes the conveyance direction of the specimen holding rack by 90 degrees at the one end of the rack conveyance path group 102 in the processing system 2, and the third conveyance direction changing unit which changes the conveyance direction of the specimen holding rack by 90 degrees between the first conveyance direction changing unit and the second conveyance direction changing unit. Therefore, it is possible to respond to layout requests resulting from the structure in the inspection room.

That is, the specimen processing system 100 can be arranged, avoiding an obstacle (for example, a column or the like which is a structure of the inspection room) existing at a position where the arrangement of the processing units forming the specimen processing system 100 is bent by 90 degrees, that is, at the position of the connection unit 6.

Also, since the arraying direction of the processing units forming the specimen processing system 100 is configured to be changed by 90 degrees by the connection unit 6, the moving distance of the operator can be minimized and the work efficiency of specimen inspection can be improved. Also, each unit can be installed in a direction in which each unit is easy for operator to use.

The specimen holding rack in the invention can hold and convey one specimen container in an upright position but is not limited to this. The specimen holding rack may be able to hold two or more specimen containers together and may be, for example, a rack called a five-section rack or ten-section rack. In this case, the conveyance direction changing units may be provided with a rotating table which rotates the conveyance direction of the rack. Instead of rotating the conveyance direction of the rack, the conveyance path where the rack is conveyed in the longitudinal direction of the rack may be connected to the conveyance path where the rack is conveyed in the lateral direction of the rack.

Also, in this example, the connection unit in the case of connecting the preprocessing units with each other is described as an example. However, the connection unit may be arranged in such away as to connect analysis systems with each other, or to connect a preprocessing system with an analysis system.

Second Embodiment

A second embodiment of the invention will be described in detail, referring to FIG. 18.

In this embodiment, in the connection unit according to the first embodiment, the unit is an empty rack branch conveyance path 12e which conveys the empty specimen holding rack 10 from the specimen holding rack fast-track conveyance path 12 to the empty rack main conveyance path 14.

FIG. 18 is a view selectively and schematically showing the connection unit in this embodiment. In the illustration, members similar to those in the first embodiment are denoted by the same reference signs and the description of these members is omitted.

In FIG. 18, a specimen holding rack fast-track conveyance path 12A is configured of: a rack conveyance path 12a which introduces, into the connection unit 6, the specimen holding rack 10 (holding the specimen container 1 housing an urgent specimen) conveyed from the specimen classification and housing block 4 connected to the upstream side in the specimen holding rack fast-track conveyance path 12A of the connection unit 6A; a rack conveyance path 12b which is connected to the downstream side of the rack conveyance path 12a at an angle of 90 degrees to the conveyance direction of the rack conveyance path 12a, receives the specimen holding rack 10 from the rack conveyance path 12a, and conveys the specimen holding rack 10, changing the conveyance direction of the rack conveyance path 12a by 90 degrees; a rack conveyance path 12c which is connected to the downstream side of the rack conveyance path 12b at an angle of 90 degrees to the conveyance direction of the rack conveyance path 12b, receives the specimen holding rack 10 from the rack conveyance path 12b, and conveys the specimen holding rack 10, changing the conveyance direction of the rack conveyance path 12b by 90 degrees; a rack conveyance path 12d which is connected to the downstream side of the rack conveyance path 12c at an angle of 90 degrees to the conveyance direction of the rack conveyance path 12c, receives the specimen holding rack 10 from the rack conveyance path 12c, conveys the specimen holding rack 10, changing the conveyance direction of the rack conveyance path 12c by 90 degrees, and delivers the specimen holding rack 10 to the specimen input block 2 connected to the downstream side in the specimen holding rack fast-track conveyance path 12 of the connection unit 6; and a empty rack branch conveyance path 12e which is connected to branch from a halfway part of the rack conveyance path 12b, receives the empty specimen holding rack 10 on the rack conveyance path 12b, and conveys the specimen holding rack 10 to the rack conveyance path 14a of the empty rack main conveyance path 14.

At the branching part between the rack conveyance path 12b and the empty rack branch conveyance path 12e, an empty rack branching mechanism 121 which switches the conveyance direction of the specimen holding rack 10 which is conveyed from the upstream side between the downstream side of the rack conveyance path 12b and the empty rack branch conveyance path 12e is provided. Upstream from the branching part, a specimen container presence/absence detection device 120 which detects whether the specimen container 1 is held by the specimen holding rack 10 or not is provided. If it is detected by the specimen container presence/absence detection device 120 that the specimen holding rack 10 conveyed on the rack conveyance path 12b holds the specimen container 1, the specimen holding rack 10 is conveyed to the downstream side of the rack conveyance path 12b. Meanwhile, if it is detected by specimen container presence/absence detection device 120 that the specimen holding rack 10 conveyed on the rack conveyance path 12b does not hold the specimen container 1, the specimen holding rack 10 is sent to the empty rack branch conveyance path 12e by the empty rack branching mechanism 121 and conveyed to the rack conveyance path 14a of the empty rack main conveyance path 14.

Similarly, the empty rack main conveyance path 14 is configured of: a rack conveyance path 14a which introduces, into the connection unit 6, the empty specimen holding rack 10 conveyed from the specimen input block 2 connected to the upstream side in the empty rack main conveyance path 14 of the connection unit 6; a rack conveyance path 14b which is connected to the downstream side of the rack conveyance path 14a at an angle of 90 degrees to the conveyance direction of the rack conveyance path 14a, receives the specimen holding rack 10 from the rack conveyance path 14a, and conveys the specimen holding rack 10, changing the conveyance direction of the rack conveyance path 14a by 90 degrees; a rack conveyance path 14c which is connected to the downstream side of the rack conveyance path 14b at an angle of 90 degrees to the conveyance direction of the rack conveyance path 14b, receives the specimen holding rack 10 from the rack conveyance path 14b, and conveys the specimen holding rack 10, changing the conveyance direction of the rack conveyance path 14b by 90 degrees; and a rack conveyance path 14d which is connected to the downstream side of the rack conveyance path 14c at an angle of 90 degrees to the conveyance direction of the rack conveyance path 14c, receives the specimen holding rack 10 from the rack conveyance path 14c, conveys the specimen holding rack 10, changing the conveyance direction of the rack conveyance path 14c by 90 degrees, and delivers the specimen holding rack 10 to the specimen classification and housing block 4 connected to the downstream side in the empty rack main conveyance path 14 of the connection unit 6. Also, the downstream end of the empty rack branch conveyance path 12e is connected to at a halfway part of the rack conveyance path 14a, and the specimen holding rack 10 conveyed on the empty rack branch conveyance path 12e is delivered to the rack conveyance path 14a.

The other parts of the configuration are similar to those in the first embodiment.

This embodiment configured as described above can achieve effects similar to those of the first embodiment.

Also, since the empty rack branch conveyance path 12e is provided in the connection unit 6, the empty specimen holding rack 10 conveyed on the specimen holding rack fast-track conveyance path 12A can be collected within the connection unit 6 and sent to the empty rack main conveyance path 14. Therefore, the conveyance of the empty specimen holding rack 10 to the specimen dispensing block 3 can be prevented. Thus, congestion in the specimen holding rack fast-track conveyance path 12A can be avoided and the urgent specimen can be conveyed quickly. The work efficiency of specimen inspection can be improved.

Third Embodiment

A third embodiment of the invention will be described in detail, referring to FIG. 19.

In this embodiment, the connection unit 6 is arranged between the specimen dispensing block 3 and the specimen classification and housing block 4 in the first embodiment.

FIG. 19 is a view schematically showing the overall configuration of a specimen processing system according to this embodiment. In the illustration, members similar to those in the first embodiment are denoted by the same reference signs and the description of these members is omitted.

In FIG. 19, a specimen processing system 100B is schematically configured of: a specimen input block 2 as a processing system including a specimen input unit 21, a centrifuge unit 22 and a stopper opening unit 23; a specimen dispensing block 3 as a processing system including a barcode pasting unit 31 and a dispensing unit 32; a specimen classification and housing block 4 as a processing system including a stopper closing unit 41 and a specimen classification and housing unit 42; two connection units 6; and an operation unit 9.

The operation unit 9 is configured to control operations of the entirety of the specimen processing system 100B and controls operations of the specimen input block 2, the specimen dispensing block 3, the specimen classification and housing block 4 and the connection units 6, including rack conveyance paths 11 to 15 (described later).

The connection units 6 are connected between one end of a rack conveyance path group 104 in the specimen classification and housing block 4 and one end of a rack conveyance path group 103 in the specimen dispensing block 3.

The other parts of the configuration are similar to those in the first embodiment.

This embodiment configured as described above can achieve effects similar to those of the first embodiment.

Also, since the two connection units 6 are provided, the specimen processing system 100B can be arranged in a U-shape rotated 90 degrees, and a layout in which the specimen input unit 21, the specimen classification and housing unit 42 and the dispensing unit 32 are arranged as closely to each other as possible is realized. Therefore, the moving distance of the operator can be minimized and each processing unit can be installed in a direction in which the operator can easily access each processing unit.

Also, the specimen processing system 100B can be arranged flexibly according to the internal shape of the inspection room and therefore requirements for a necessary space for the installation of the specimen processing system 100 can be relaxed.

Also, the invention is not limited to each of the above embodiments and includes various modifications. For example, the above embodiments are described in detail in order to intelligibly explain the invention of the application and are not necessarily limited to having all the components described above.

REFERENCE SIGNS LIST 1 specimen container
2 specimen input block (processing system)
3 specimen dispensing block (processing system)
4 specimen classification and housing block (processing system)
6 connection unit
9 operation unit
10 specimen holding rack
11 specimen holding rack main conveyance path (rack conveyance path)
12 specimen holding rack fast-track conveyance path (rack conveyance path)
13 specimen holding rack return conveyance path (rack conveyance path)
14 empty rack main conveyance path (rack conveyance path)
15 empty rack return conveyance path (rack conveyance path)
21 specimen input unit
22 centrifuge unit
23 stopper opening unit
31 barcode pasting unit
32 dispensing unit
41 stopper closing unit
42 specimen classification and housing unit
100, 100B specimen processing system

The invention claimed is:

1. A specimen conveyance device, comprising:
a connection unit that connects one end of a first processing system and one end of a second processing system,
wherein the first processing system has a first path group including a plurality of rack conveyance paths disposed in parallel which convey a specimen holding rack holding a specimen container,
wherein the second processing system has a second path group including a plurality of rack conveyance paths disposed in parallel which convey specimen holding racks holding specimen containers,
wherein the first processing system includes a first opening and closing part having an access surface that is configured to be opened and closed to allow access,
wherein the second processing system includes a second opening and closing part having an access surface that is configured to be opened and closed to allow access,
wherein upon connection of the first processing system and the second processing system by the connection unit, a first distance along a first horizontal plane from the access surface of the first processing system to the one end of the second processing system is longer than a second distance by which the first opening and closing part of the first processing system moves when opening, and a third distance along a second horizontal plane from a front surface of the second processing system to the one end of the first processing system is longer than a fourth distance by which the second opening and closing part of the second processing system moves when opening,
wherein the connection unit includes a third path group, which includes a plurality of first rack conveyance paths, a plurality of second rack conveyance paths, a plurality of third rack conveyance paths and a plurality of fourth rack conveyance paths,
wherein each of the plurality of first rack conveyance paths are respectively connected to one of the plurality of paths of the first path group of the first processing system,
wherein each of the plurality of fourth rack conveyance paths are respectively connected to one of the plurality of paths of the second path group of the second processing system,
wherein each first rack conveyance path is respectively connected to each second rack conveyance path and each first rack conveyance path is perpendicular with respect to each second rack conveyance path,
wherein each second rack conveyance path is respectively connected to each third rack conveyance path and each second rack conveyance path is perpendicular with respect to each third rack conveyance path,
wherein each third rack conveyance path is respectively connected to each fourth rack conveyance path and each third rack conveyance path is perpendicular with respect to each fourth rack conveyance path, and
wherein a spacing between each adjacent rack conveyance path of the first path group of the first processing system is different than a spacing between adjacent rack conveyance paths of the third path group of the connection unit.

2. The specimen conveyance device according to claim 1, wherein the first opening and closing part has a first movement range which opens and closes at least a part of an exterior and the second opening and closing part has a second movement range which opens and closes at least a part of an exterior,
wherein at least one of the first opening and closing part and the second opening and closing part has a door mechanism, and
wherein the first movement range and the second movement range do not overlap each other.

3. The specimen conveyance device according to claim 1, wherein
wherein the first opening and closing part and the second opening and closing part has a drawer mechanism which is configured to be drawn out, and
wherein upon connection of the first processing system and the second processing system by the connection unit, the first distance along the first horizontal plane from the access surface of the first processing system to the one end of the second processing system is longer than the second distance by which the drawer mechanism of the first processing system moves when opening and that the third distance along the second horizontal plane from the front surface of the second processing system to the one end of the first processing system is longer than the fourth distance by which the drawer mechanism of the second processing system moves when opening.

4. The specimen conveyance device according to claim 1, wherein
the connection unit is made up of two units including a first unit which connects one end of the first path group in the first processing system and a second unit which connects one end of the second path group in the second processing system.

5. The specimen conveyance device according to claim 1, wherein one of the paths of the third path group is a fast-track conveyance path which conveys, preferentially over other specimen containers, a specimen container holding rack of a specimen container housing a specimen to be processed preferentially over other specimens.

6. A specimen processing system, comprising:
a first processing system and a second processing system;
a connection unit which connects one end of the first processing system and one end of the second processing system,
wherein the first processing system has a first path group including a plurality of rack conveyance paths disposed in parallel which convey a specimen holding rack holding a specimen container,
wherein the second processing system has a second path group including a plurality of rack conveyance paths disposed in parallel which convey specimen holding racks holding specimen containers,
wherein the first processing system includes a first opening and closing part having an access surface that is configured to be opened and closed for access,
wherein the second processing system includes a second opening and closing part having an access surface that is configured to be opened and closed to allow access,
wherein upon connection of the first processing system and the second processing system by the connection unit a first distance along a first horizontal plane from the access surface of the first processing system to the one end of the second processing system is longer than a second distance by which the first opening and closing part of the first processing system moves when opening and a third distance along a second horizontal plane from a front surface of the second processing system to the one end of the first processing system is longer than a fourth distance by which the second opening and closing part of the second processing system moves when opening,
wherein the connection unit includes a third path group, which includes a plurality of first rack conveyance paths, a plurality of second rack conveyance paths, a plurality of third rack conveyance paths and a plurality of fourth rack conveyance paths,
wherein each of the plurality of first rack conveyance paths are respectively connected to one of the plurality of paths of the first path group of the first processing system,
wherein each of the plurality of fourth rack conveyance paths are respectively connected to one of the plurality of paths of the second path group of the second processing system,
wherein each first rack conveyance path is respectively connected to each second rack conveyance path and each first rack conveyance path is perpendicular with respect to each second rack conveyance path,
wherein each second rack conveyance path is respectively connected to each third rack conveyance path and each second rack conveyance path is perpendicular with respect to each third rack conveyance path,
wherein each third rack conveyance path is respectively connected to each fourth rack conveyance path and each third rack conveyance path is perpendicular with respect to each fourth rack conveyance path, and
wherein a spacing between each adjacent rack conveyance path of the first path group of the first processing system is different than a spacing between adjacent rack conveyance paths of the third path group of the connection unit.

* * * * *